May 15, 1928.  C. CHRISTIANSON  1,669,738
TRANSMISSION ATTACHMENT
Filed June 13, 1927  2 Sheets-Sheet 1
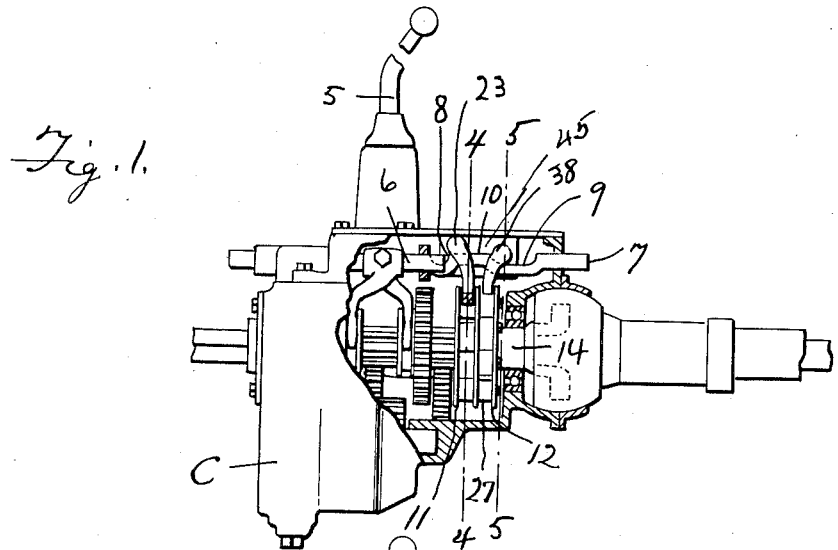
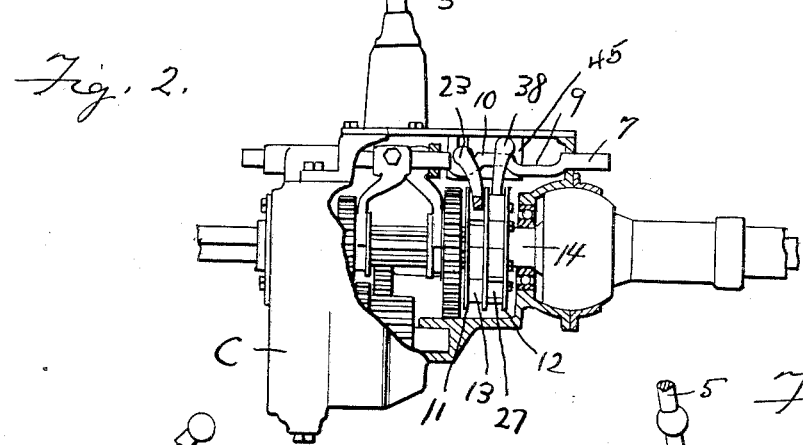
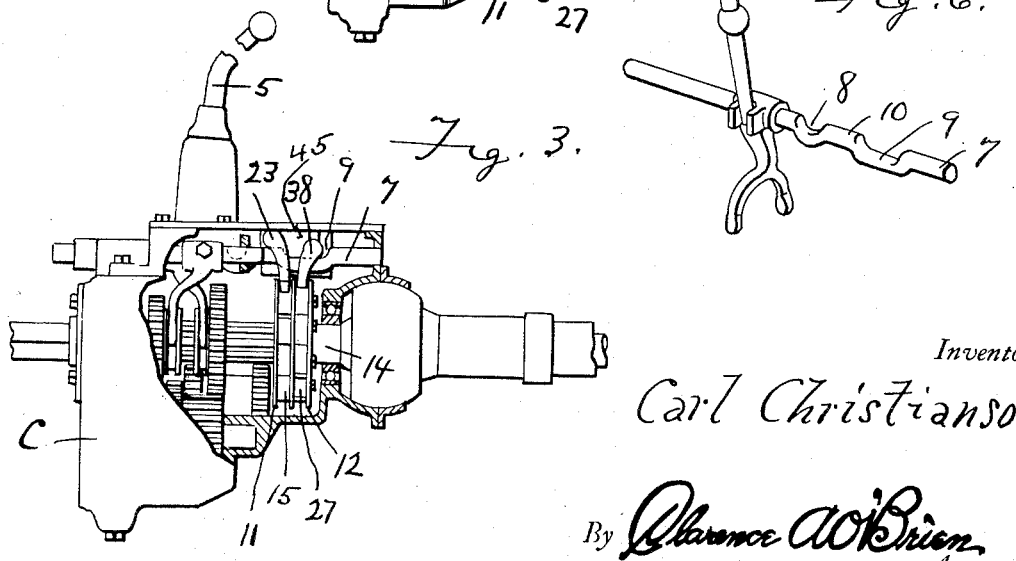
Inventor
Carl Christianson
By Clarence A. O'Brien
Attorney

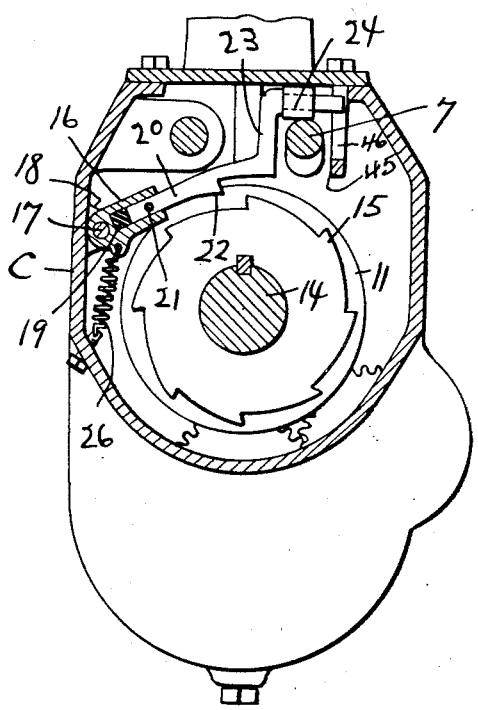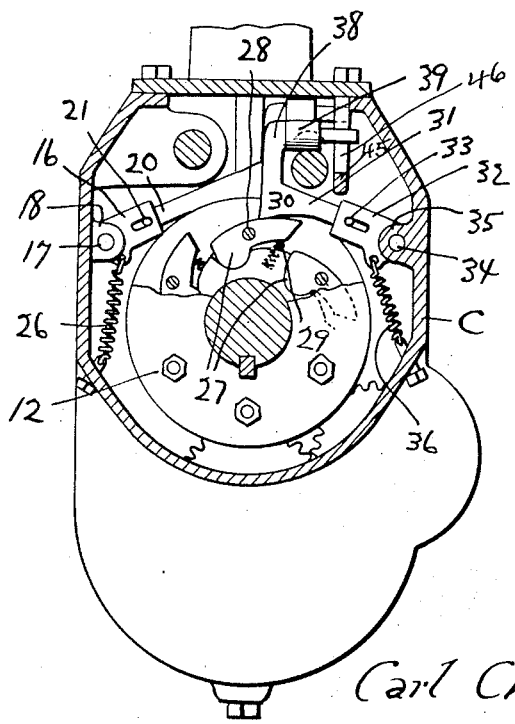

Patented May 15, 1928.

1,669,738

UNITED STATES PATENT OFFICE.

CARL CHRISTIANSON, OF MADISON, WISCONSIN.

TRANSMISSION ATTACHMENT.

Application filed June 13, 1927. Serial No. 198,545.

The present invention relates to an improvement in a transmission such as is used in automobiles and the like and has for its principal object to provide a structure for preventing the backing up of the automobile when the transmission has been shifted into low gear and the operator releases his foot from the foot brake to actuate the accelerator, just before letting in the clutch. It is well known that frequently when a start is made on an upgrade that the automobile will back up between the time the operator releases the foot brake to accelerate the engine and lets in the clutch. This is an annoyance which is obviated by the structure of my invention.

Another important object of my invention resides in the provision of a structure which prevents the automobile from moving forwardly when the transmission is in reverse speed and the vehicle is facing downgrade.

Another important object of the invention resides in the provision of a structure of this nature which is operated by the usual gear shift lever and requires no special attention on the part of the operator of the vehicle.

A still further very important object of the invention resides in the provision of an improvement of this nature which is simple in its construction, easy to install without the necessity of any great changes in the present transmission mechanism, is thoroughly efficient and reliable in operation, is compact and convenient, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a sectional elevation of a transmission showing my improvements and the transmission in neutral, Figure 2 is a similar view showing the transmission in reverse, Figure 3 is a similar view showing the transmission in low speed, Figure 4 is an enlarged transverse section taken substantially on the line 4—4 of Figure 1, Figure 5 is an enlarged sectional view taken substantially on the line 5—5 of Figure 1, and Figure 6 is a perspective view of the shifter fork rod embodying my improved structure.

Referring to the drawing in detail it will be seen that the letter C denotes the transmission casing with the usual well known transmission mechanism therein of which no special detailed description is necessary, but certain portions thereof will be referred to specifically to bring out clearly the operation of the improvements. The numeral 5 denotes the usual gear shift lever which is movable to operate the high and intermediate speed shifter fork rod of conventional construction and my improved low and reverse speed shifter fork rod 7 the rear portion of which is provided with hollows 8 and 9 with a hump 10 therebetween. A pair of annular channeled members 11 and 12 are keyed to the driven shaft 14 of the transmission mechanism. The annular channeled member 11 has formed in the channel thereof ratchet teeth 15. A socket member 16 is pivoted as at 17 to a bracket 18 inside the transmission case C. This socket member 16 has a cushion 19 therein and receives one end of a shank 20 which has a pin and slot connection 21 therewith and is formed with a pawl 22 to engage the ratchet teeth 15 and has an angular extension 23 with a roller 24 thereon engaged by the hump and hollows of the shifter fork rod 7. When the transmission is in its neutral position as shown in Figure 1 it will be seen that the hump 10 engages the roller 24 and holds the pawl 22 out of engagement with the ratchets 15 so that the driven shaft may rotate in its forward speed rotation which is counter-clockwise in Figure 4. If, however, the shifter fork rod 7 is shifted to its reverse position as shown in Figure 2 the roller 24 will slip into the hollow 8 because of the position of spring 26 and the pawl 22 will engage one of the ratchet teeth 15, the cushion 19 functioning as a buffer and thus the driven shaft 14 is prevented from rotating so that the vehicle might coast forwardly if pointing downwardly on a down grade.

In the annular channel member 12 there are pivoted ratchet elements 27, being pivoted intermediate their ends as at 28 and held in predetermined position by springs 29 so that one end of each ratchet element will be in a position to engage a pawl 30 if the driven shaft is rotated in a direction to allow the vehicle to back up, that is in a clockwise direction as shown in Figure 5. The other ends of the ratchet elements are weighted by being made larger so that when a predetermined speed is reached, the spring 29 will be compressed, because centrifugal force will swing the ratchet elements to accomplish this and thereby preventing a clicking noise and unnecessary wear as would otherwise be the case. The pawl 30 is formed on a shank 31 receivable in a cushioned socket member 32 similar to the socket member 16 and has a pin and slot connection 33 therewith. The socket member 32 is pivotally mounted as at 34 on a bracket 35 projecting inwardly from one side of the casing C. A spring 36 is engaged with the socket member 32 and normally holds the same to urge the pawl 30 into engagement with the ratchet elements 27. An extension 38 rises from the pawl end of the shank 31 and has a roller 39 thereon engageable with the shifter fork rod 7 for cooperation with the hump 10 and the hollow 9. When the transmission mechanism is in neutral the roller 39 is in the hollow 9 and therefore the pawl 30 is engageable with the ratchet elements 27 as is clearly shown in Figure 5 to prevent the reversing of the driven shaft 14 by the backward movement of the vehicle. When the transmission is shifted to low gear as shown in Figure 3 the roller 39 still remains in the hollow 9. When the transmission mechanism is shifted to reverse, however, the roller 39 is lifted by the hump 10 to lift the pawl 30 clear of the ratchet elements 27.

Attention is directed to the guide plate 45 which extends down from the cover or otherwise mounted and has slots 46 therein for receiving the ends of the members 23 and 38 to prevent rocking thereof as the member 7 is shifted.

It is thought that the construction, operation, and advantages of this invention will now be quite apparent to those skilled in this art without a more detailed description thereof. The present embodiment of the invention has been disclosed in detail merely by way of example since in actual practice it will attain the features of advantage enumerated as desirable in the statement of the invention and the above description. It is apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a transmission mechanism, a driven shaft, means actuatable to prevent the shaft from rotating in one direction, means actuatable for preventing rotation of the shaft in the other direction, said means having extensions, a low and reverse shifter fork rod having humps and hollows engageable with said extensions for actuating the means.

2. In a transmission mechanism, a driven shaft, a pair of channeled members on the driven shaft, ratchet elements in the channel members, the ratchet elements in one member being oppositely disposed to those in the other member, pawl means for engaging the ratchet elements, a low and reverse shifter fork rod having means for actuating the pawls to operative and inoperative positions.

In testimony whereof I affix my signature.

CARL CHRISTIANSON.